Figure 1:
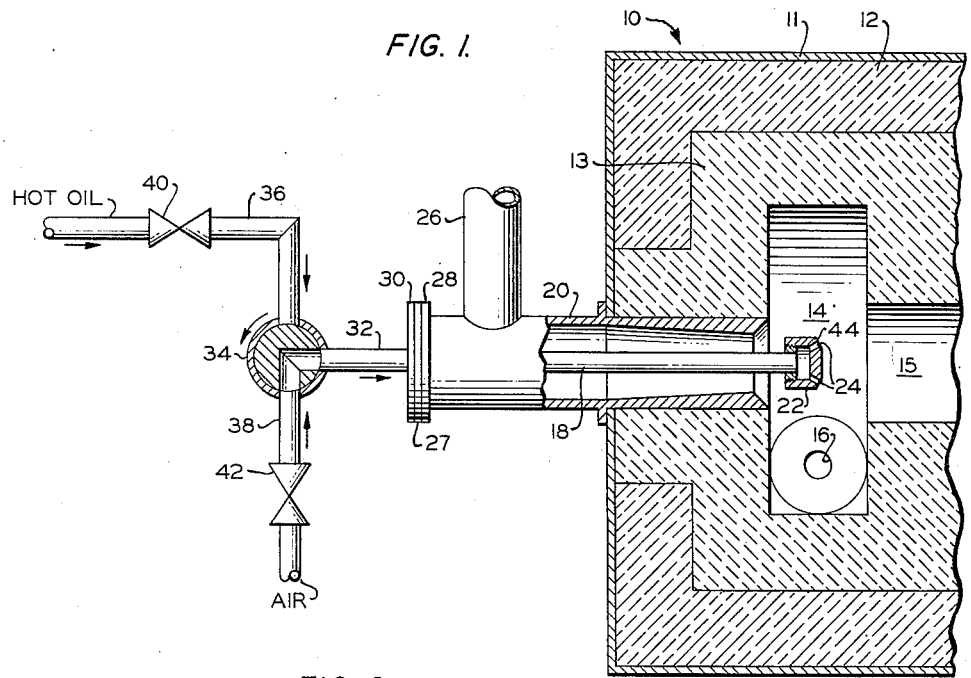

Oct. 8, 1957     H. A. LARSON     2,809,098

CARBON BLACK PROCESS AND APPARATUS

Filed Oct. 3, 1955

INVENTOR.
H. A. LARSON
BY Hudson & Young
ATTORNEYS

United States Patent Office 2,809,098
Patented Oct. 8, 1957

2,809,098

CARBON BLACK PROCESS AND APPARATUS

Harold A. Larson, Borger, Tex., assignor to Phillips Petroleum Company, a corporation of Delaware Application October 3, 1955, Serial No. 538,001

12 Claims. (Cl. 23—209.4)

This invention relates to an improved process and arrangement of apparatus for the manufacture of carbon black.

In the manufacture of one type of carbon black known as Philblack "I," a special oil tube or nozzle provided with spaced-apart spray holes extends into a hot combustion section of the furnace where coking temperatures exist. It is found that after two or three days run the interior of the nozzle, particularly the spray holes, acquires a sufficient deposit of coke to interfere with the flow rate of oil and with the spray pattern and to impair the quality of the carbon black produced in the process. In order to restore the normal flow rate and the high quality of the black being produced by the furnace, it has heretofore been necessary to take the furnace off production and remove the nozzle from the reactor for mechanical removal of the coke. This procedure has been found rather expensive and hazardous because the hot oil piping had to be unflanged each time and the nozzle sent to a machine shop for removal of the coke.

I have devised a method whereby the coke is readily removed from the interior of the oil feed nozzle to a carbon black reactor or furnace without removal of the tube from the furnace and without shutting the furnace down.

The principal object of the invention is to provide an improved method of removing the coke from a carbon black furnace feed tube or nozzle without removing the nozzle from the furnace. Another object is to provide a method for removing coke from the feed tubes or nozzles of a series of carbon black furnaces without taking the furnace off stream and without impairing the quality of the carbon black produced by the furnaces during the coke removal process. Another object is to provide an improved method of operating a series of carbon black furnaces wherein coke accumulates in the oil spray tubes or nozzles and the same is removed from one or two furnaces at a time without taking the furnaces off stream and without impairing the quality of the product carbon black obtained during the coke removal. It is also an object of the invention to provide an improved arrangement of apparatus for producing carbon black which permits or provides for the removal of coke from the feed injection tubes or nozzles without disassembling the furnaces, without removal of the tubes therefrom, and without impairing the quality of the carbon black produced during the coke removal step. Other objects of the invention will become apparent from a consideration of the accompanying disclosure.

I have found that in the operation of a series of carbon black reactors or furnaces which feed into a common effluent system which recovers the carbon black produced in the reactors, the coke which forms in the feed injection tubes subjected to coking conditions can be removed without cutting off flow of gaseous effluent from the furnace into the common effluent line and without deterioration of the black quality of the product recovered from the series of furnaces. The method of the invention comprises cutting off the flow of oil to an individual furnace feed tube or nozzle without cutting off the flow of hot combustion gas to the combustion zone surrounding the feed tube or nozzle and without cutting off the flow of effluent from the furnace to the common collection system, and passing air or other suitable combustion-supporting gas through the feed tube into the combustion section of the furnace whereby the coke within the feed tube is burned out so as to restore the same to normal operation. It requires a period in the range of about 15 minutes to one hour to burn out the coke in accordance with the invention and resume oil flow through the feed tube to restore normal carbon black production. In this manner, preferably one furnace at a time in a series of furnaces is operated in the manner described so as to remove the coke deposit in the oil feed tube, and the other furnaces in the battery of the furnaces are treated in turn in the same manner so as to maintain a high rate and high quality of carbon black production without the more time consuming, expensive, and hazardous procedure required before my invention.

Figure 2:
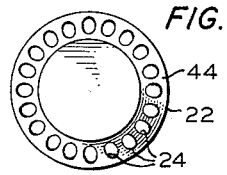
Figure 3:
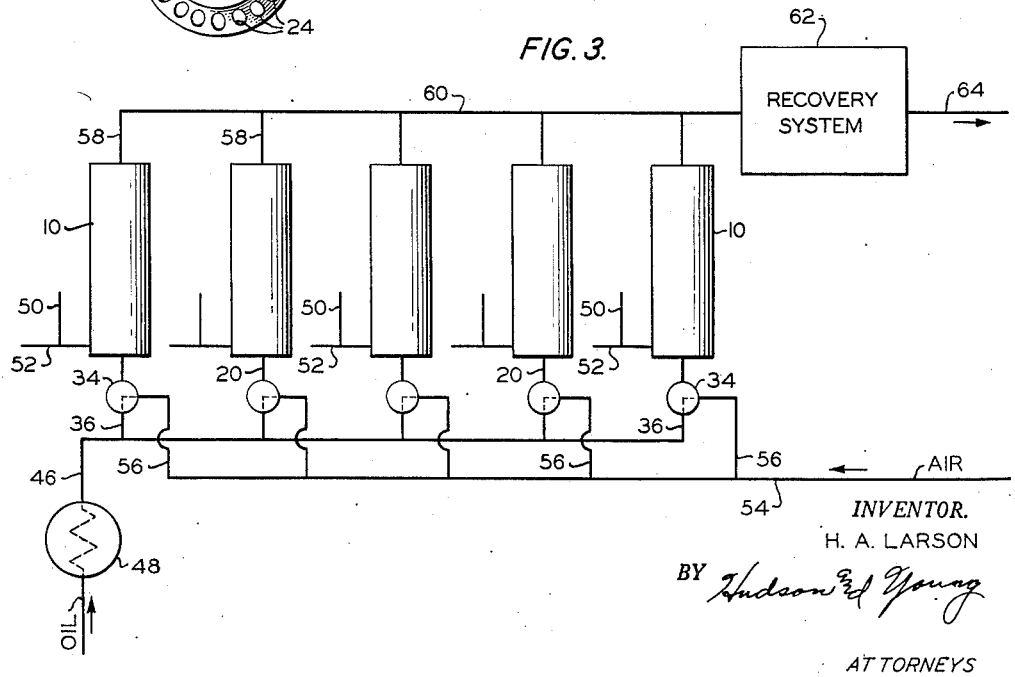

A more complete understanding of the invention may be had by reference to the accompanying drawing of which Figure 1 is an elevation, partially in section, of the feed end of a carbon black furnace and the piping arrangement for effecting the process of the invention; Figure 2 is an end view of a conventional feed injection nozzle shown in Figure 1; and Figure 3 is a plan view of a battery of carbon black furnaces arranged for operation in accordance with the invention. The various figures are schematic and similar elements are designated with corresponding numbers.

Referring to Figure 1, a furnace 10 comprises a shell 11 having an insulating liner 12, a super-refractory interior 13 forming a precombustion chamber 14, and a reaction section 15. Tangential combustion gas is introduced to precombustion zone 14 through one or more tangential ports 16 containing suitable burners. A feed injection tube or spray tube 18 is disposed axially within an air supply conduit 20 which in turn is axially disposed in the inlet end of the furnace. Tube 18 ordinarily extends into precombustion chamber 14 a short distance, such as ¼" to 4", and is provided with a spray head 22 containing a plurality of spray holes 24, although coking in the feed tube will take place even though the tube does not actually extend into the combustion zone but is merely exposed to radiant heat from this zone. The invention is applicable to carbon removal from a feed injection tube either extending into the combustion zone or located so as to receive radiant heat therefrom. A conduit 26 feeds axial air through an annular space around tube 18 to prevent coke deposits inside said oil tube and to direct oil into precombustion zone 14. Tube 18 terminates in flange 27 which is clamped by suitable means, such as bolts, between flange 28 of tube 20 and flange 30 of feed line 32. A three-way valve 34 is provided in line 32. Oil feed line 36 is connected with one inlet port of valve 34 and air line 38 is connected with the other inlet port. Cut off valves 40 and 42 are provided in the oil and air lines, respectively.

Figure 2 shows one embodiment of an oil spray nozzle which is now in operation in a commercial carbon black producing furnace. Nozzle 22 is provided with a beveled section 44 (shown more clearly in Figure 1). Nozzle holes 24 are positioned in bevel section 44 and extend with their axes obliquely positioned with respect to the axis of tube 18 and normal to the face of the bevel. The exact structure of the spray head or nozzle is not critical to the invention as other types of feed inlet tubes may be utilized, with coke removal in accordance with the invention.

Figure 3 shows a battery of furnaces 10 arranged to be fed by a common oil line 46 and branch lines 36. A heater 48 in oil line 46 is provided for preheating the oil feed to the furnaces. Tangential combustion gas is supplied to each furnace by burning a mixture of air from line 50 and fuel, such as natural gas, from line 52 in a burner positioned in one or more ports 16 (shown in Figure 1). Air for burning off coke from the interior of the feed tubes or nozzles is supplied by line 54 which connects with three-way valve 34 by means of branched lines 56. Effluent gases from the furnaces are passed via lines 58 to a common collecting line 60 which feeds to a recovery system 62. Product carbon black is passed via line 64 to packaging, shipping, or other conventional treatment.

In operation, each carbon black furnace is supplied with hot oil usually at a temperature of at least 500° F. and, in one type of operation, at a temperature in the range of about 725 to 775° F., through line 36 and feed tubes 18 into the hot precombustion chamber of the furnace. The temperature in the furnace combustion section surrounding or adjacent nozzle 22 is of the order of 2900° F., which is substantially above coking temperatures of the oil, and this results in gradual deposition of coke inside of the section of tube 18 within the combustion zone of the furnace and within nozzle 22 and particularly spray holes 24. This coke deposition results in decreased oil flow rates and substantial alteration of the spray pattern of the oil and oil vapor, whereby both the yield and quality of the carbon black being produced are materially reduced. In operation prior to the invention it was the practice to shut down the furnace, disconnect the oil feed line, and remove oil tube 18 by unbolting flanges 28 and 30 and mechanically removing the coke from the interior of tube 18 and from spray holes 24.

In order to remove coke deposit from tube 18 and nozzle 22 in accordance with the invention, three-way valve 34 provides for the shutting off of the hot oil feed to the feed injection tube and passage of air or other combustion-supporting gas through the feed tube and the nozzle so as to burn out the coke obstruction without disassembling the oil feed assembly and without altering the flow of combustion gas to the furnace through ports 16 so that after the burn-out is effected, resumption of normal carbon black production may be effected by merely reversing three-way valve 34, thereby cutting off the flow of air and again passing hot oil into the furnace in the usual manner.

The burn out step is usually effected while maintaining the temperature of the interior of the furnace at the conventional operating level of about 2900° F. in the precombustion section so as to expedite the burning of the coke. This maintenance of operating temperatures also decreases lost production since there is no time lag between the burn out and resumption of carbon black production. Hence, it is preferred to continue tangential injection of air and combustion gas as well as injection of annular air around tube 18, but it is within the scope of the invention to vary these streams from their normal flow rates. It is important, however, to not permit the temperature within the furnace to rise substantially above 2900° F.

In operating a battery of furnaces such as that illustrated in Figure 3, it has been found that the coke deposition can be removed from the interior of the spray tube or nozzle of any one of the furnaces without shutting off the flow of effluent from line 58 into collection line 60 and without impairment of the quality of the black recovered through line 64.

Certain modifications of the invention will become apparent to those skilled in the art and the illustrative details disclosed are not to be construed as imposing unnecessary limitations on the invention.

I claim:

1. In a process for operating a series of carbon black-producing furnaces comprising injecting oil into each of said furnaces through a plurality of spray holes in a nozzle exposed to radiant heat from the combustion area of said furnace; admixing oxygen-containing gas with said oil in said furnace so as to burn only a portion of said oil and pyrolytically convert remaining oil to carbon black, whereby said nozzle is subjected to coking temperatures of at least 2000° F. and at least a portion of said spray holes are periodically partly filled with coke: the improvement comprising cutting off the oil supply to the spray holes in the nozzle of not more than two furnaces, without interrupting the carbon black producing process in the remaining furnaces, and immediately injecting oxygen-containing gas in combustion-supporting concentration through said nozzle whereby the coke in said holes is substantially completely burned off.

2. The process of claim 1 including the steps of cutting off the supply of air to said nozzle and flowing oil thereto to resume the production of carbon black.

3. In a process for operating a series of carbon black-producing furnaces comprising injecting oil into each of said furnaces through a plurality of spray holes in a nozzle exposed to radiant heat from the combustion area of said furnace; admixing oxygen-containing gas with said oil in said furnace so as to burn only a portion of said oil and pyrolytically convert remaining oil to carbon black, whereby said nozzle is subjected to coking temperatures of at least 2000° F. and at least a portion of said spray holes are periodically partly filled with coke; and collecting the effluent carbon black stream from each of said furnaces in a common collection system: the improvement comprising cutting off the oil supply to the spray holes in the nozzle of not more than two furnaces, without interrupting the carbon black producing process in the remaining furnaces, and immediately injecting oxygen-containing gas in combustion-supporting concentration through said nozzle whereby the coke in said holes is substantially completely burned off.

4. The process of claim 3 including the steps of cutting off the supply of air to said nozzle and flowing oil thereto to resume the production of carbon black.

5. In a process for pyrolytically converting a hydrocarbon oil to carbon black comprising injecting hot oil through small holes in a nozzle exposed to radiant heat from the hot combustion area of a furnace and burning a portion of said oil in admixture with oxygen to provide heat to crack a remaining portion of said oil to carbon black, whereby said holes become partially plugged with coke: the improvement comprising discontinuing the flow of oil through said nozzle and injecting oxygen-containing gas in combustion-supporting concentration through said nozzle so as to burn the carbon therefrom; thereafter cutting off the flow of the oxygen-containing gas to said nozzle and again injecting oil through said nozzle so as to resume the production of carbon black.

6. In a process for pyrolytically converting a hydrocarbon oil to carbon black comprising injecting hot oil through small holes in a nozzle exposed to radiant heat from the hot combustion area of a furnace and burning a portion of said oil in admixture with oxygen to provide heat to crack a remaining portion of said oil to carbon black, whereby the interior of said nozzle acquires a coating of coke which interferes with the normal spray pattern of the oil: the improvement comprising discontinuing the flow of oil through said nozzle and injecting oxygen-containing gas in combustion-supporting concentration through said nozzle so as to burn the carbon therefrom; thereafter cutting off the flow of the oxygen-containing gas to said nozzle and again injecting oil through said nozzle so as to resume the production of carbon black.

7. In a process for pyrolytically converting a hydrocarbon oil to carbon black wherein said oil at a temperature of at least 500° F. is injected into the hot combustion zone of a carbon black furnace through a feed tube exposed to radiant heat from said combustion zone and to coking temperatures whereby the interior of said tube becomes coked and the injection pattern and flow rate are substantially altered: the improvement comprising cutting off the flow of oil to said tube and passing combustion-supporting gas through same so as to burn out said coke without shutting down said furnace.

8. In a process for pyrolytically converting a hydrocarbon oil to carbon black wherein said oil at a temperature of at least 500° F. is injected into the hot combustion zone of a carbon black furnace through a feed tube axially thereof at the inlet end; air is injected through an annulus surrounding said tube to provide combustion of a portion of said oil; a combustible mixture of air and fuel is burned adjacent the wall of said furnace and the hot combustion products are injected tangentially thereinto at said inlet end surrounding said inlet tube whereby said feed tube is exposed to radiant heat from said combustion zone; and wherein the delivery end of said tube is exposed to coking temperatures whereby coke is deposited within said tube: the improvement comprising cutting off the flow of oil to said tube without cutting off the tangential flow of hot combustion products and passing air through said tube so as to burn out said coke without shutting down said furnace.

9. An arrangement of apparatus for producing carbon black comprising a series of carbon black furnaces having effluent lines from each furnace connected with a common collection line; an oil feed line leading to the inlet end of each furnace; an oil-injection tube connected with each said feed line and extending to the combustion chamber of its respective furnace; an air line and an oil supply line connected through a three-way valve with each said oil feed line, providing alternate flow of oil and air through said feed line and injection tube; and means for injecting hot combustion gas into each said combustion chamber.

10. The apparatus of claim 9 wherein said oil-injection tube terminates at the inner end in a nozzle provided with spray holes directed in a diverging spray pattern and said tube is positioned axially with respect to said furnace.

11. The apparatus of claim 10 wherein said oil-injection tube is disposed within an air supply tube providing an annulus therebetween for air injection.

12. A carbon black furnace comprising an insulated reaction and combustion chamber of generally cylindrical configuration; an effluent line leading from one end of said chamber; an axially positioned oil-injection tube extending into the opposite end of said chamber; an air supply conduit coaxial with and of larger diameter than said tube, thereby providing an air injection annulus around said tube; an air supply line connected with said conduit; a three-way valve having its outlet port connected to the outer end of said oil-injection tube; an oil supply line connected with one inlet port of said valve; an air line connected with the other inlet port of said valve; and means for introducing hot combustion gas into the inlet end of said furnace.

References Cited in the file of this patent

UNITED STATES PATENTS

| | | |
|---|---|---|
| 1,276,385 | McCourt et al. | Aug. 20, 1918 |
| 1,987,643 | Spear et al. | Jan. 15, 1935 |
| 2,564,700 | Krejci | Aug. 21, 1951 |
| 2,616,795 | Krejci | Nov. 4, 1952 |
| 2,617,714 | Arnold | Nov. 11, 1952 |
| 2,659,663 | Heller | Nov. 17, 1953 |